(12) United States Patent
Farner et al.

(10) Patent No.: US 8,511,722 B1
(45) Date of Patent: Aug. 20, 2013

(54) KNOT TYING DEVICE

(76) Inventors: Kim Alan Farner, Rydal, GA (US);
George Robert Rose, Etowah, TN (US);
Betty Lou Wallace, Athens, TN (US)

( * ) Notice: Subject to any disclaimer, the term of this patent is extended or adjusted under 35 U.S.C. 154(b) by 0 days.

(21) Appl. No.: 13/476,090

(22) Filed: May 21, 2012

(51) Int. Cl.
*D03J 3/00* (2006.01)
(52) U.S. Cl.
USPC ............................................. 289/17
(58) Field of Classification Search
USPC ............................. 289/13, 17, 18.1
See application file for complete search history.

(56) References Cited

U.S. PATENT DOCUMENTS

| | | | |
|---|---|---|---|
| 2,947,558 A | 8/1960 | Bethune, Jr. | |
| 3,106,417 A | 10/1963 | Clow | |
| 3,494,648 A | 2/1970 | Stephens | |
| 3,700,272 A | 10/1972 | Bauer | |
| 3,713,680 A | 1/1973 | Pagano | |
| 3,756,638 A * | 9/1973 | Stockberger | 289/17 |
| 3,787,081 A | 1/1974 | Macy | |
| 3,837,691 A | 9/1974 | Smythe | |
| 3,877,737 A | 4/1975 | Chappell | |
| 4,400,025 A | 8/1983 | Dennison | |
| 4,403,797 A | 9/1983 | Ragland, Jr. | |
| 4,572,554 A | 2/1986 | Janssen et al. | |
| 4,573,719 A * | 3/1986 | Aldridge | 289/17 |
| 4,613,173 A | 9/1986 | Rosser | |
| 5,020,833 A | 6/1991 | Wardall | |
| 2005/0116471 A1 * | 6/2005 | Muir et al. | 289/17 |

* cited by examiner

*Primary Examiner* — Shaun R Hurley

(57) ABSTRACT

Disclosed is an improved knot tying device consisting of an elongated rigid body containing a silicon rubber insert with an aperture, a U-shaped member containing a side notch, a top notch, a bottom notch, and a groove in and around the U-shaped member with the device incorporating a rear tubular hook holder and index finger grip. This knot tying device enables an angler to quickly join a monofilament fishing line, braided or super braided fishing line, or fluorocarbon fishing line securely to that of a monofilament or fluorocarbon leader. The disclosed knot tying device also allows for an angler to safely attach a fish hook to a monofilament fishing line, braided fishing line, or fluorocarbon fishing line and, by the use of the aperture in the silicon rubber insert, allows for an angler's "third hand" as the fishing lines are held in place and without damage.

9 Claims, 4 Drawing Sheets

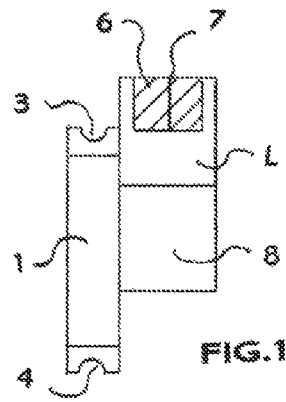
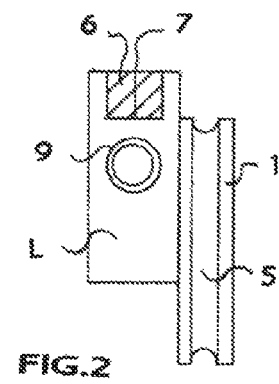
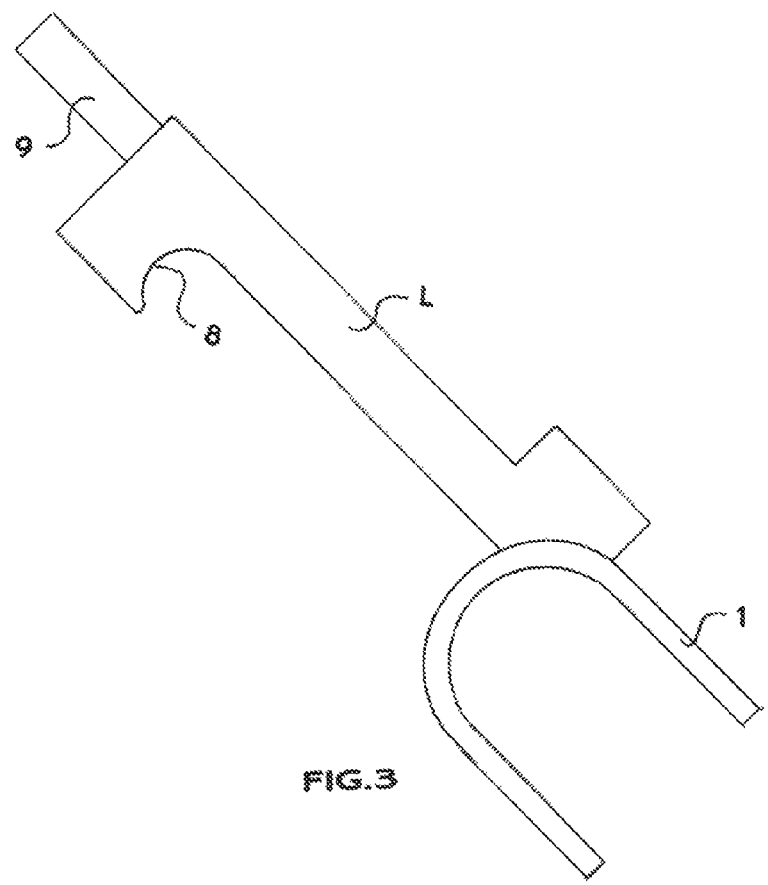

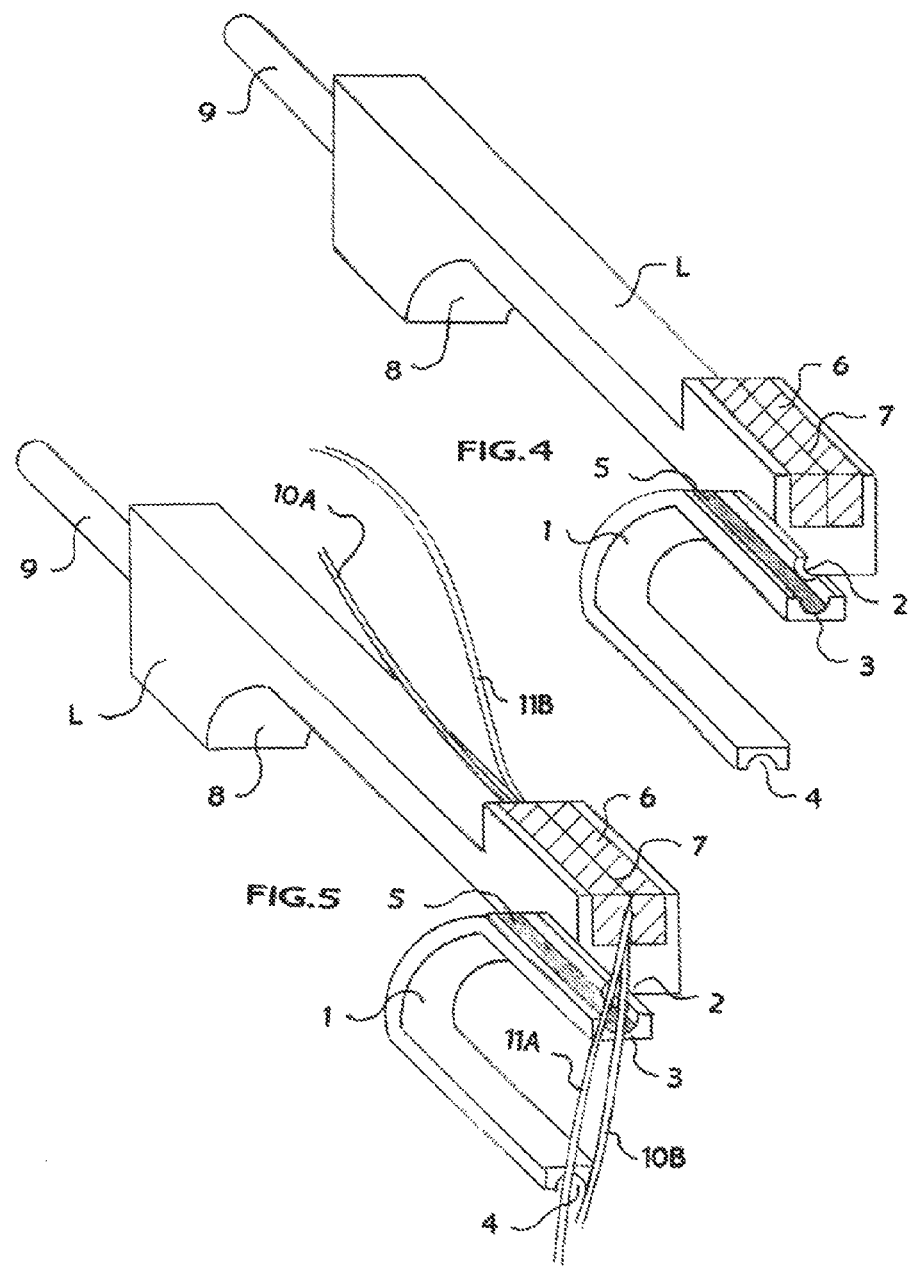

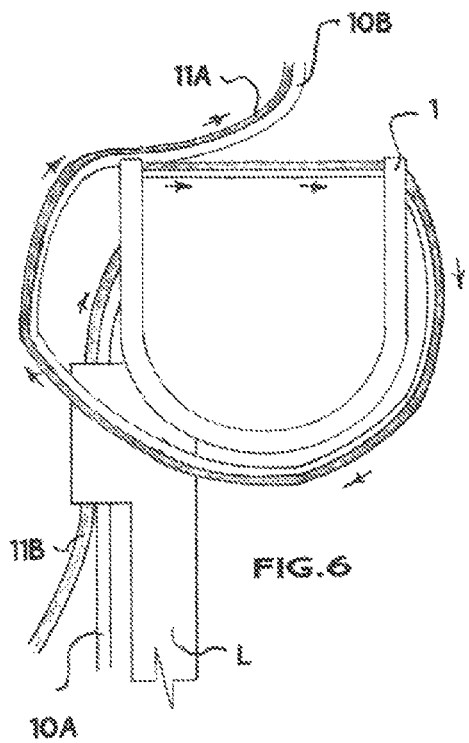
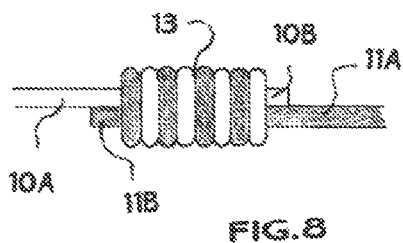
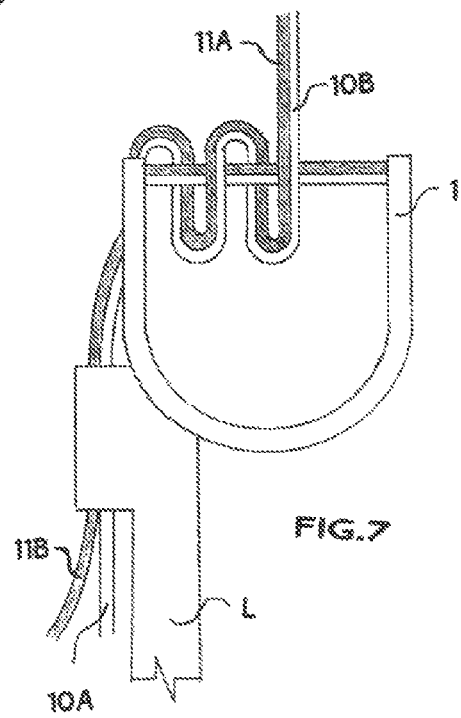

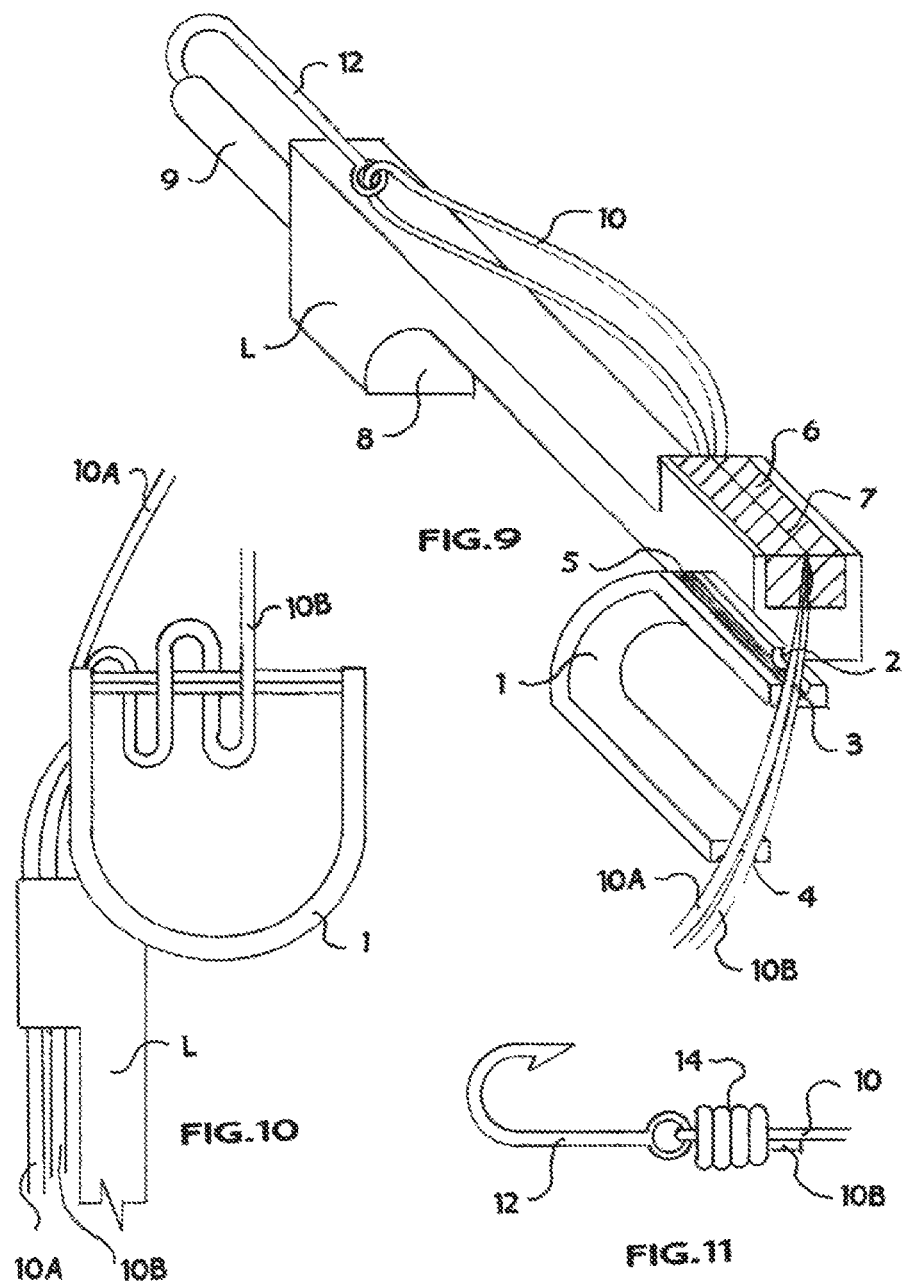

KNOT TYING DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

TECHNICAL FIELD OF INVENTION

The present invention relates to a knot tying device which assists an angler in the tying of fishing knots, specifically the joining of a fishing line to that of a leader line and the fabrication of a knot which attaches a fish hook to that of a fishing line.

BACKGROUND OF INVENTION

Men and women who fish for sport or fish professionally have struggled for years to effectively join a fishing line to another line such as a line made of a leader material. Different fishing situations can require the angler to join a heavier, larger diameter fishing line to that of a lighter, smaller diameter leader line or may require the angler to join a smaller diameter fishing line to that of a larger diameter leader line. To add to this dilemma, the angler often uses fishing lines made of monofilament lines, braided lines, super braided lines, and fluorocarbon lines in conjunction with leaders made of monofilament or fluorocarbon materials.

One common method used by anglers to join a fishing line to a leader line is by the use of a swivel in which the angler secures the fishing line to one end of the swivel by forming a knot in the fishing line and then secures the leader line to the other end of the swivel by forming a knot in the leader line. The angler using the swivel method is often faced with numerous disadvantages in his or her fishing adventures. First, the swivel method requires the angler to fabricate an additional knot between his or her hook or lure and his or her rod and reel. Second, swivels are usually chrome or bronze colored or painted black which means that the swivel will be highly visible to the fish. Third, swivels produce a wake or drag when pulled through the water. Often, the angler is faced with fishing situations that require an angler to present a lure, live or dead bait in such a manner that enables the lure, live or dead bait to appear as natural to the fish as possible. The angler using a swivel attachment cannot achieve this presentation because the swivel is visible and creates a disturbance when pulled through the water.

The second popular method to join a fishing line to that of a leader line is for the angler to secure the fishing line to the leader line by the fabrication of a Blood knot. An angler using the Blood knot method of joining a fishing line to a leader line is required to place the fishing line parallel to that of the leader line with the end of the fishing line extending several inches past that of the leader line and the end of the leader line extending several inches past that of the fishing line. The angler then creates a space between the fishing line and the leader line with his or her thumb or finger of one hand. While the angler maintains this space, the angler begins to wrap the end of the fishing line clockwise around the leader line until four or five full wraps are completed. While the angler maintains the space between the line and leader and while holding the wrapped portion of the leader line, the angler then begins to wrap the end of the leader line counter clockwise around that of the fishing line until four or five full wraps are completed. Now, with the angler maintaining the space between the fishing line and leader and the angler holding the wrapped portion of the fishing line over leader line and the leader line over the fishing line, the angler threads the end of the fishing line through the space between the fishing line and leader line. After threading the end of the fishing line through the space, the angler then proceeds to thread the end of the leader line through the space between the fishing line and leader line from the opposite side of the space that the end of the fishing line was inserted. After completing these steps, the angler begins to form the Blood knot by pulling the end of the leader line in an opposite direction from the end of the fishing line and by pulling the main fishing line in an opposite direction from the main leader line.

The Blood knot is a complicated knot for almost any angler; however, tying the Blood knot in extreme weather conditions such as wind, rain, sleet, or cold weather is even more complex. In addition to weather conditions, an angler must be physically capable to tie the Blood knot. If an angler possesses a physical condition such as arthritis, tremors, poor eye sight, or has dexterity problems tying the Blood knot can be a monstrous and frustrating task. Further, many anglers find that tying the Blood knot is time consuming often requiring the angler to spend several minutes to effectively tie the knot.

Numerous prior art attempts have been made, by several inventors, to solve the problems of anglers to tie an effective, strong, and quick knot when joining a fishing line to that of a leader line and to assist anglers who suffer from physical ailments such as arthritis, tremors, poor eye sight, and poor dexterity in various weather conditions such as cold, wind, and rain.

The present invention relates to a novel method for joining a fishing line and leader line together and the production of a less complicated knot which can be tied faster than the traditional Blood knot regardless if the angler ties the traditional Blood knot by hand or with the use of a device. The present invention also relates to an angler's "third hand" as it incorporates a silicon rubber insert with an aperture which effectively holds the fishing line and leader line without damage while the angler ties the knot.

This invention relates to a knot tying device which allows for the angler to combine the fishing line with the leader line in the aperture of the silicon rubber insert of the device. The angler then, by simply threading the two lines into and around the U-shaped member of the device and then wrapping the lines around the lines spanning the U-shaped member, creates a modified Blood knot which is quicker to tie than the traditional Blood knot. An angler, using this present knot tying device, creates a modified Blood knot by combining the fishing line and the leader line and then wrapping both lines simultaneously whereas the traditional Blood knot essentially wraps one line over the other line and the ends of the two lines are inserted through an opening between the two wraps of the fishing line, on one side, and the leader line, on the other side.

This invention, in addition to fabricating a modified Blood knot, also allows an angler to effectively tie a fish hook to a fishing line with a modified Hangman's knot. Further, this present invention also relates to an angler's safety as it incorporates a tubular hook holder in the rear of the device. An angler, after threading a fish hook with the fishing line, inserts the point of the hook into the tubular hook holder and proceeds to thread the main fishing line and tag end of the fishing line into and through the aperture of the silicon rubber insert of the device. To create the modified Hangman's knot, the angler simply combines the main line and the tag end of the fishing line and wraps the combined lines around the U-shaped member of the device. After completing this wrap of the U-shaped member, the angler then separates the combined lines and inserts the tag end of the fishing line into the center of the U-shaped member. The angler then begins to wrap the tag end of the fishing line around that of the combined lines which span the U-shaped member.

Further, this invention relates to a knot tying device which can easily be fabricated by molding of plastic or machined from a variety of materials and is inexpensive to manufacture. The present invention is lightweight and can be held comfortably in the hand of an adult or a child and provides the angler suffering with physical conditions such as arthritis, tremors, or poor eye sight a fast and efficient means to attach a fishing line to a leader line.

PRIOR ART KNOWN TO THESE INVENTORS

U.S. Pat. No. 2,825,592 granted to J. McK. Semple, 4 Mar. 1958, discloses a portable knot tying device directed at assisting the angler tying a Blood knot or Barrel knot.

U.S. Pat. No. 2,947,558 granted to G. R. Bethune Jr., 2 Aug. 1960, discloses a knot tying apparatus directed at assisting the angler tying a Barrel knot with the apparatus having mechanical features.

U.S. Pat. No. 3,106,417 granted to D. J. Clow, 8 Oct. 1963, discloses a knot tying device comprising of elongated U-shaped body having a pair of spaced parallel side members which enables the angler to place the threaded hook on one end and then place the fishing line through the pair of spaced parallel side member and then enabling the angler to wrap the end of the fishing line around the two parallel side members after which the angler re-inserts the end of the fishing line through the two parallel side members and underneath the wraps which had been made around the device.

U.S. Pat. No. 3,494,648 granted to H. L. Stephens, 10 Feb. 1970, discloses a device for tying knots in monofilament lines.

U.S. Pat. No. 3,572,788 granted to S. F. Cruzan, 30 Mar. 1971, discloses a device for knotting cord and the like comprising of a U-shaped having a handle and resilient springs on the legs of the U-shaped element.

U.S. Pat. No. 3,700,272 granted to G. J. Bauer, 24 Oct. 1972, discloses a fisherman's knot tying device comprising of a plastic cylinder mounted in a semi-cylindrical recess mounted on a plastic sheet.

U.S. Pat. No. 3,713,680 granted to S. J. Pagano, 30 Jan. 1973, discloses a knot tying device for barrel knots comprising of four resiliently releasable retaining means located on a block.

U.S. Pat. No. 3,787,081 granted to C. L. Macy, 22 Jan. 1974, discloses barrel knot tying device with an inner U-shaped member and an outer U-shaped member with a notched member between the two U-shaped members.

U.S. Pat. No. 3,837,691 granted to R. N. Smythe, 24 Sep. 1974, discloses a knot tying apparatus and fish disgorger comprising of an elongated rigid body with two flange portions with a groove extending along the length of the apparatus with a slot in the elongated portion opposite the knot tying end of the apparatus. The angler, using this apparatus, threads the fishing line through the eye of the fish hook or lure, places the hook or lure in the slot opposite the knot tying end of the apparatus, threads the fishing lines into the groove running the length of the apparatus, wraps the end of the fishing line around the apparatus towards that of the hook or lure, and then re-inserts the end of the fishing line into the groove running the length of the apparatus.

U.S. Pat. No. 3,877,737 granted to G. D. Chappell, 15 Apr. 1975, discloses a fishing knot tying device for tying Blood knots comprising a vertically slotted main body, right and left slotted knobs having slotted knob extensions rotatable mounted.

U.S. Pat. No. 4,400,025 granted to R. R. Dennison, 23 Aug. 1983, discloses a leader tying vice device comprising of a U-shaped base portion with two spaced apart legs.

U.S. Pat. No. 4,403,797 granted to E. Ragland Jr., 13 Sep. 1983, discloses a fishing knot line tying tool of an elongated and planer body with a hook holding tube at the front of the tool and a pair of notched fins at the rear of the tool with a lateral projection of rubber like material. The angler, using this tool, inserts the fishing line into the rubber like projection, then threads the eye of the hook, placing the hook inside the tubular hook holder, and with the end of the fishing line, in hand, places the end of the fishing line into a notch in one fin and then places the end of the fishing line in the notch in the other fin, the angler then runs the end of the fishing line towards the hook and wraps the end of the fishing line around that of the tubular hook holder twice and then proceeds to run the end of the fishing line back toward the two fins placing the end of the fishing line underneath the line between the two fins and above the tool.

U.S. Pat. No. 4,572,554 granted to Janssen et al., 25 Feb. 1986, discloses a knot tying device for forming a Barrel knot comprising of two identical tools used in symmetrical juxtaposition.

U.S. Pat. No. 4,613,173 granted to R. Rosser, 23 Sep. 1986, discloses a portable knot tying jig.

U.S. Pat. No. 4,864,762 granted to D. D. Cox, 12 Sep. 1989, discloses a line tying device comprising of an elongated mandrel with a ring structure at the opposite in of the line tying device and a depression and groove at the line tying device.

U.S. Pat. No. 5,020,833 granted to T. E. Wardall, 4 Jun. 1991, discloses an accessory tool for anglers comprising of two class one levers and a fulcrum between them.

U.S. Pat. No. 5,098,137 granted to T. E. Wardall, 24 Mar. 1992, discloses a device for facilitating knot tying comprising of a generally flat and rectangular device with a hole at one end and a fork at the other.

U.S. Pat. No. 5,240,295 granted to D. R. Spencer, 31 Aug. 1993, discloses a knot tying device comprising of a frame with two legs, a gap between the legs, and two winders along an axis of the legs of the knot tying device.

U.S. Pat. No. 5,469,652 granted to J. Drosdak, 28 Nov. 1995, discloses a fishing leader and connector comprising of a threaded connector.

U.S. Pat. No. 5,593,189 granted to J. Little, 14 Jan. 1997, discloses a knot tying device comprising of a unitary elongated main body with a working end and a second handle end.

U.S. Pat. No. 5,647,616 granted to H. W. Hamilton, 15 Jul. 1997, discloses a safety fishhook dispenser and tying device comprising of an elongated, thin, multi-curved implement with a cylindrical longitudinal bore through the implement.

U.S. Pat. No. 5,690,369 granted to W. F. Steck III, 25 Nov. 1997, discloses a fisherman's knot tying device comprising of a base with two spaced-apart legs at right angles.

U.S. Pat. No. 6,322,112 granted to F. R. Duncan, 27 Nov. 2001, discloses a knot tying apparatus configured in the shape of a fish wherein the holding members consists of hinged connections.

U.S. Pat. No. 7,494,162 granted to C. F. Howell, 24 Feb. 2009, discloses a knot tying device for joining leaders comprising of a rectangular card body with a swivel disc adapted to a pivot in the card body.

BRIEF SUMMARY OF THE INVENTION

In general, this knot tying device has a rigid elongated body with a tubular hook holder at the rear of the device and incorporates several unique and novel features such as a silicon rubber insert with an aperture, at the top front of the device, which is capable of securely holding a monofilament fishing line, braided or super braided fishing line, or fluorocarbon fishing line in conjunction with a fishing leader from either monofilament material or fluorocarbon material. This silicon rubber insert and an aperture through the silicon rubber insert provide the angler with an effective "third hand" and will not damage the fishing line or fishing leader when the lines or leaders are placed into and removed from the knot tying device. This knot tying device also incorporates a unique and novel U-shaped member at the front and to the side of the device which the angler threads the combined line and leader into and then around the U-shaped member to fabricate a modified Blood knot. This knot tying device enables the angler to tie a modified Blood knot quickly and securely without the frustration the angler often encounters when attempting to tie the traditional Blood knot.

The principle objects of this knot tying device are to provide the angler with a device which assists the angler in tying knots, in an efficient and safe manner, such as the modified Blood knot which is used to join a fishing line to a fishing leader and also a device capable of assisting the angler in tying the modified Hangman's knot when the angler wishes to securely attach a fish hook to a fishing line such as monofilament lines, braided or super braided lines, and fluorocarbon lines in line strengths to 80 pound test. Another object of this knot tying device is an angler's safety when attaching a sharp fish hook to that of a monofilament fishing line, braided fishing line, or fluorocarbon fishing line by incorporating a hollow tubular fish hook holder at the rear of the device. Further, the device is portable and may be carried in the angler's pocket or tackle box, lightweight, and can be easily held by the angler's thumb and index finger of one hand while fabricating either the modified Blood knot or the modified Hangman's knot.

BRIEF DESCRIPTION OF DRAWINGS

FIG. 1—Front View of Knot Tying Device
FIG. 2—Rear View of Knot Tying Device
FIG. 3—Side View of Knot Tying Device
FIG. 4—Dimensional View of Knot Tying Device
FIG. 5—Dimensional View of Knot Tying Device with Line and Leader inserted into aperture of silicon rubber insert
FIG. 6—Partial Side View of Knot Tying Device with Line and Leader wrapped clockwise around U-shaped Member
FIG. 7—Partial Side View of Knot Tying Device with Line and Leader wrapped clockwise around U-shaped Member and revealing Line & Leader wrap to form the modified Blood Knot
FIG. 8—Side View of the Modified Blood Knot FIG. 9—Dimensional View of the Knot Tying Device with Line connected to a fishing hook and line threaded through the aperture of the silicon rubber insert
FIG. 10—Partial Side View of the Knot Tying Device with the Line/Leader wrapped around the U-shaped Member revealing the tag end of the fishing line wrapped around the line/leader crossing the U-shaped Member
FIG. 11—Side View of the modified Hangman's Knot

REFERENCE NUMERALS IN DRAWINGS

L—Knot Tying Device
1—U-shaped Member
2—Side Notch in U-shaped Member
3—Top Notch in U-shaped Member
4—Bottom Notch in U-shaped Member
5—Groove in U-shaped Member
6—Silicon Rubber Insert
7—Aperture
8—Index Finger Grip
9—Hook Holder with Compression Spring
10—Fishing Line
10A—Main Fishing Line to Rod/Reel
10B—Tag End of Fishing Line
11A—Main Leader Line to Hook or Lure
11B—Tag End of Leader Line
12—Fish Hook
13—Modified Blood Knot
14—Modified Hangman's Knot

DETAILED DESCRIPTIONS OF DRAWINGS

FIG. 1 illustrates the front view of the knot tying device L, with a frontal view of the U-shaped member 1, top notch in U-shaped member 3, bottom notch in U-shaped member 4, silicon rubber insert 6, aperture 7, and index finger grip 8.

FIG. 2 illustrates the rear view of the knot tying device L, with a rear view of the U-shaped member 1, groove in U-shaped member 5, silicon rubber insert 6, aperture 7, and tubular hook holder 9.

FIG. 3 illustrates the side view of the knot tying device L, with a side view of the U-shaped member 1, index finger grip 8, and tubular hook holder 9.

FIG. 4 illustrates a dimensional view of the knot tying device L, with a dimensional view of the U-shaped member 1, side notch in U-shaped member 2, top notch in U-shaped member 3, bottom notch in U-shaped member 4, groove in U-shaped member 5, silicon rubber insert 6, aperture 7, index finger grip 8, and tubular hook holder 9.

FIG. 5 illustrates a dimensional view of the knot tying device L, with a dimensional view of the U-shaped member 1, side notch in U-shaped member 2, top notch in U-shaped member 3, bottom notch in U-shaped member 4, groove in U-shaped member 5, silicon rubber insert 6, aperture 7, index finger grip 8, tubular hook holder 9, main fishing line to rod and reel 10A, tag end of fishing line 10B, main leader line to hook or lure 11A, and tag in of leader line 11B. FIG. 5 further illustrates the main fishing line 10A inserted into the silicon rubber insert 6 through the aperture 7 of the knot tying device L with the main fishing line 10A entering the aperture of the silicon rubber insert from the rear of the knot tying device L and allowing for several inches of the tag end of the fishing line 10B to exit the aperture 7 of the silicon rubber insert 6 of the knot tying device L. The main leader line 11A, to the hook or lure, is threaded through the aperture 7 of the silicon rubber insert 6 of the knot tying device L from the front of the knot tying device L allowing for several inches of leader line 11B to pass through the aperture 7 of the silicon rubber insert 6 of the knot tying device L with the leader line 11B exiting the aperture 7 of the silicon rubber insert 6 towards the tubular hook holder 9 of the knot tying device L. FIG. 5 also illustrates how an angler threads the tag end of the fishing line 10B and the main leader line 11A into the side notch 2 of the U-shaped member 1 of the knot tying device L after the tag end of the fishing line 10B and main leader line 11A have exited the aperture 7 of the silicon rubber insert 6 of the front of the knot tying device L.

FIG. 6 illustrates a partial side view of the knot tying device L with the U-shaped member 1, main fishing line 10A, tag end of the fishing line 10B, main leader line 11A, and the tag end of the leader line 11B. FIG. 6 further illustrates how an angler threads the end of the fishing line 10B and main leader line 11A around the U-shaped member 1 in a clockwise direction.

FIG. 7 illustrates a partial side view of the knot tying device L with the U-shaped member 1, main fishing line 10A, tag end of the fishing line 10B, main leader line 11A, and tag end of the leader line 11B. FIG. 7 further illustrates how an angler wraps the combined lines, tag end of the fishing line 10B and the main leader line 11A, through the center of the U-shaped member 1 and around the end of the fishing line 10B and main leader line 11A which span the top notch 3 and bottom notch 4 of the U-shaped member 1 of the knot tying device L. After the angler has completed 3 or 4 complete wraps around the lines that span the U-shaped member 1, the angler then removes the combined lines, tag end of the fishing line 10B and main leader line 11A, from the U-shaped member 1 of the knot tying device L by placing his or her thumb into the center of the U-shaped member 1 and gently pushing the combined lines which span the U-shaped member 1 and the wraps that surround the combined lines outward to the front of the U-shaped member 1 of the knot tying device L. As the angler pushes the combined lines and wraps away from the U-shaped member 1 of the knot tying device L, the main fishing line 10A and tag end of the leader line 11B are allowed to slide through the aperture 7 of the silicon rubber insert 6 of the knot tying device L providing slack to remove the combined lines and wraps from the U-shaped member 1 of the knot tying device L. After the angler removes the combined lines and wraps from the U-shaped member 1 of the knot tying device L and has removed the main fishing line 10A and tag end of the leader line 11B from the aperture 7 of the silicon rubber insert 6 of the knot tying device L, the angler then proceeds to place the main fishing line 10A and the tag end of the leader line 11B in one hand and the tag end of the fishing line 10B and the main leader line 11A in their other hand. The angler grasping the lines in their respective hands then proceeds to pull their hands apart from one another in an opposite direction forming and tightening the modified Blood knot 13.

FIG. 8 illustrates a side view of the modified Blood knot 13 with the main fishing line 10A and the main leader line 11A after the tag end of the fishing line 10B and tag end of the leader line 11B have been snipped.

FIG. 9 illustrates a dimensional view of the knot tying device L with a dimensional view of the U-shaped member 1, side notch 2, top notch 3, bottom notch 4, groove 5, silicon rubber insert 6, aperture 7, index finger grip 8, tubular hook holder 9, fishing line 10, main fishing line 10A, tag end of the fishing line 10B, and fish hook 12. FIG. 9 further illustrates how an angler after threading the fishing line 10 through the eye of the fish hook 12 places the threaded fish hook 12 into that of the tubular hook holder 9 of the knot tying device. The angler then proceeds to thread both parts of the fishing line 10 into the aperture 7 of the silicon rubber insert 6 of the knot tying device L with the fishing line 10 exiting the aperture 7 of the silicon rubber insert 6 with the main fishing line 10A to the rod and reel and allowing for several inches of the tag end of the fishing line 10B to exit the aperture 7 of the silicon rubber insert 6 to the front of the knot tying device L. FIG. 9 further illustrates how an angler threads the main fishing line 10A and tag end of the fishing line 10B into the groove 5 of the U-shaped member 1 through the side notch 2 of the U-shaped member 1 after the main fishing line 10A and tag end of the fishing line 10B exit the aperture 7 of the silicon rubber insert 6 of the knot tying device L.

FIG. 10 illustrates a partial side view of the knot tying device L with a side view of the U-shaped member 1, main fishing line 10A and tag end of the fishing line 10B. FIG. 10 further illustrates how an angler, after threading a fish hook 12 with fishing line 10 and placing the fish hook 12 into the tubular hook holder 9 and threading the main fishing line 10A and tag end of the fishing line 10B into the aperture 7 of the silicon rubber insert 6 of the knot tying device L as described in FIG. 9, begins the process for forming the modified Hangman's knot 14. After the main fishing line 10A and the tag end of the leader line 10B exit the aperture 7 of the silicon rubber insert 6 of the knot tying device L, the angler combines the main fishing line 10A with the tag end of the fishing line 10B and threads the combined lines into and around the U-shaped member 1 in a clockwise direction around the U-shaped member 1 of the knot tying device L as described in FIG. 6. FIG. 10 further illustrates how an angler, after completing one complete wrap around the U-shaped member 1 with the combined lines of the main fishing line 10A and the tag end of the fishing line 10B, then separates the main fishing line 10A from the tag end of the fishing line 10B and proceeds to thread the tag end of the fishing line 10B into the center of the U-shaped member underneath the combined lines of the main fishing line 10A and the tag end of the fishing line 10B which span the opening of the U-shaped member 1 of the knot tying device L. The angler then proceeds to wrap the tag end of the fishing line 10B around the combined lines which span the U-shaped member 1 of the knot tying device L. After the angler has completed three to four complete wraps around the combined lines which span the U-shaped member 1, the angler uses their thumb to remove the combined lines and wraps from the U-shaped member 1 of the knot tying device L by placing their thumb into the center of the U-shaped member 1 and gently pushing the combined lines which span the U-shaped member and the wraps outward to the front of the knot tying device L. As the angler gently pushes the combined lines and wraps outward away from the knot tying device L, the fishing line 10A is allowed to slide through the eye of the fish hook 12 and through that of the aperture 7 of the silicon rubber insert 6 and around the U-shaped member 1 providing the angler with enough slack in the fishing line 10A and tag end of the fishing line 10B to easily remove the lines from the U-shaped member 1 of the knot tying device L. After the angler has removed the lines from the U-shaped member 1, the angler proceeds to remove the fish hook 12 from the tubular hook holder 9 and removes the main fishing line 10A and tag end of the fishing line 10B from the aperture 7 of the silicon rubber insert 6 of the knot tying device L. The angler then grasps the fish hook 12 safely in one hand while grasping the main fishing line 10A and the tag end of the fishing line 10B in their other hand and gently pulls both hands in an opposite direction to one another forming and tightening the modified Hangman's knot 14.

FIG. 11 illustrates a side view of the modified Hangman's knot 14 with the fishing line 10 connected to that of the fish hook 12 and the tag end of the fishing line 10B snipped close to the modified Hangman's knot 14.

What we claim:

1. A knot tying device comprising of an elongated rigid body consisting of a tubular shaft at the rear of the device, a pair of buttresses at right angles of the elongated body near the front and top of the device supporting a silicon rubber insert with an aperture in the silicon rubber with the device having a U-shaped member to the side of the device containing a side notch, top notch, bottom notch, and a center groove around the U-shaped member of the device with said device having a concave grip area to the rear and bottom of the device.

2. A knot tying device, as described in claim 1, wherein the U-shaped member to the front and side of the device is fabricated by the molding of plastic or machined from materials.

3. A knot tying device, as described in claim 1 or claim 2, wherein the notch to the side of the U-shaped member is semicircular.

4. A knot tying device, as described in claim 1 or claim 2, wherein the notch to the top of the U-shaped member is semicircular.

5. A knot tying device, as described in claim 1 or claim 2, wherein the notch to the bottom of the U-shaped member is semicircular.

6. A knot tying device, as described in claim 1 or claim 2, wherein the groove in the center of the U-shaped member is located on the exterior or outer surface of the U-shaped member with the center groove extending the length of the U-shaped member from that of the top notch to that of the bottom notch.

7. A knot tying device, as described in claim 1 or claim 2, wherein the side notch is positioned adjacent to that of one end of the rubber insert and being in close proximity to that of the end of the uppermost support of the U-shaped member.

8. A knot tying device, as described in claim 1 or claim 2, wherein the top notch is positioned on the uppermost support at the beginning of the opening of the U shaped member.

9. A knot tying device, as described in claim 1 or claim 2, wherein the bottom notch is positioned on the lowest support at the conclusion of the opening of the U shaped member.

\* \* \* \* \*